(12) United States Patent
Zhang et al.

(10) Patent No.: US 7,975,568 B2
(45) Date of Patent: Jul. 12, 2011

(54) ROBOTIC ARM DRIVING MECHANISM

(75) Inventors: Dongsheng Zhang, Singapore (SG); Ajit Gaunekar, Singapore (SG); Gang Ou, Singapore (SG)

(73) Assignee: ASM Technology Singapore Pte Ltd, Singapore (SG)

( * ) Notice: Subject to any disclaimer, the term of this patent is extended or adjusted under 35 U.S.C. 154(b) by 569 days.

(21) Appl. No.: 12/108,900

(22) Filed: Apr. 24, 2008

(65) Prior Publication Data
US 2009/0266194 A1 Oct. 29, 2009

(51) Int. Cl.
*B25J 17/00* (2006.01)
*B25J 17/02* (2006.01)
*B25J 18/00* (2006.01)

(52) U.S. Cl. ............... 74/490.03; 74/490.05; 901/19

(58) Field of Classification Search ............ 74/490.01, 74/490.02, 490.03, 490.04, 490.05; 901/14, 901/15, 19; 414/744.1
See application file for complete search history.

(56) References Cited

U.S. PATENT DOCUMENTS

| | | | |
|---|---|---|---|
| 5,064,340 A | 11/1991 | Genov et al. | 414/744.5 |
| 6,709,521 B1 | 3/2004 | Hiroki | 118/719 |
| 6,737,826 B2 * | 5/2004 | Gilchrist | 318/568.21 |
| 6,893,204 B1 * | 5/2005 | Suzuki et al. | 414/744.5 |
| 2002/0148320 A1 * | 10/2002 | Kimata et al. | 74/490.01 |
| 2005/0115352 A1 * | 6/2005 | Tanaka | 74/490.03 |

* cited by examiner

*Primary Examiner* — Justin Krause
(74) *Attorney, Agent, or Firm* — Ostrolenk Faber LLP

(57) ABSTRACT

A robotic arm assembly is provided comprising a driving mechanism including a rotor which is rotatable relative to a stator. The rotor is coaxially rotatable about a columnar shaft having a substantially hollow central longitudinal axis. A first arm having proximal and distal pivotal ends is rigidly mounted on the rotor such that the first arm is drivable to rotate by the driving mechanism. A proximal pivotal end of a second arm having proximal and distal pivotal ends is pivotally connected to the proximal pivotal end of the first arm. A first timing pulley is mounted coaxially onto the columnar shaft, and a second timing pulley which is spaced from the first pulley is drivable to rotate together with rotation of the first arm. A timing belt connects the first and second timing pulleys and is operative to rotate the second arm relative to the first arm as the first arm is driven to rotate by the driving mechanism, such that the distal pivotal ends of the first and second arms are configured to always lie along a substantially straight line.

20 Claims, 4 Drawing Sheets

ROBOTIC ARM DRIVING MECHANISM

FIELD OF THE INVENTION

The present invention relates to a robotic arm, and in particular to a robotic arm structure which is operable for positioning an end-effector of the robotic arm to perform various functions.

BACKGROUND AND PRIOR ART

Conventional Selective Compliant Articulated/Assembly Robot Arms (SCARA) in the market are driven through transmission systems, such as gear trains, belts-and-pulleys, chains and linkages, which are used to transmit power from the drive motors to move a load carried by an end-effector attached to the robotic arms. The motors are typically located at the base of the robot structure, and the robotic arms are moved by the transmission systems linking the drive motor to the arms.

Generally, robotic arms exhibit angular ($\theta$), vertical (Z) and radial (R) motions in a cylindrical coordinate system. Angular motion refers to rotation of the robotic arm about a vertical axis at the position which the arm is pivoted to the robot body. Vertical or Z motion comprises vertical elevation of the robotic arm with reference to a base of the robotic system. Radial or R motion denotes extension or retraction motion of the robotic arm resulting in a straight-line motion of the end-effector which is typically attached to a distal end of the robotic arm. The rotational motion of a radial motor may be converted into linear motion of the end-effector to attain such radial motion.

U.S. Pat. No. 5,064,340 entitled "Precision Arm Mechanism" discloses an arrangement of a pulley and transmission belt system to achieve radial motion of an end-effector in a robotic arm. An arm structure of the robotic arm includes either two or three links pivotally connected to one another with an end-effector at the distal end of the distal link. Straight line movement of the pivoting mounting place of the end-effector is provided from a rotating drive wheel coaxial with the pivoting of the proximal end of the proximal link. A drive wheel arranged coaxially with the pivot of the proximal end of the proximal link causes the first and second links to pivot about their pivot axis. This pivoting causes the first link to pivot about its proximal end and causes the end-effector to pivot in the two link version and causes the second and third links to pivot about their pivot axis in the three link version.

As such, the power from a motor driver is not directly transmitted to a first pivot axis pivoted to a base of the robotic arm to a proximal link, but is transmitted to a second pivot axis before it is transmitted back to the first pivot axis to drive the proximal link. A similar transmission of power takes place from the second pivot axis to the third pivot axis which brings about straight line movement of the pivoting mounting place of the end-effector. A gearing housing may be located intermediate the ends of the proximal link to provide a gearing adjustment. The interconnected links of the robotic arm in this prior art are driven through a relatively complex timing belt transmission mechanism which makes the structure of the robotic arm complex. Therefore, accuracy and reliability may suffer.

U.S. Pat. No. 6,709,521 entitled "Transfer Apparatus And Accommodating Apparatus For Semiconductor Process, And Semiconductor Processing System" discloses a simpler arrangement of a pulley and transmission belt system comprising a first motor stacked on top of a second motor. A main transmission which is part of the main driving mechanism for rotating and extending/retracting a robotic arm connects the first motor and first to third links of the apparatus. The main transmission comprises a pair of gear pulleys disposed at the proximal and distal ends of each of the links. A timing belt extends between each pair of the gear pulleys and coaxial shafts comprised in each link.

The first link is driven directly by the first motor to rotate when the motor turns a shaft which connects the motor to the first link. The main driving mechanism transmits this rotational driving force to the third link or end-effector through an elaborate arrangement of gear pulleys and timing belts. One shortcoming of this design is that the housing of the first motor is completely enclosed and this apparatus does not ensure that electrical and service lines that drive the motors do not affect the production environment. External electrical cabling and wiring to the motors may inhibit rotation of the robotic arm about a 360° angle and may introduce foreign matter or unwanted obstructions caused by the exposed wiring. Furthermore, the first link is joined to the first motor by a relatively long and slender shaft that is coupled to a rotor of the first motor. This may cause compliance errors resulting from the bending of the shaft when the robotic arm is being driven such that the degree of rotation of the first motor's rotor at one end of the shaft may not be exactly the same as the degree of rotation of the first link at the other end of the shaft.

It is therefore desirable to devise a robotic arm structure that is able to achieve the required radial motion by implementing a simple pulley and belt transmission mechanism using only one motor to achieve radial motion, which also offers a substantially uninhibited rotational range as well as compactness.

SUMMARY OF THE INVENTION

It is thus an object of this invention to seek to provide an improved driving mechanism for a robotic arm structure which is operative to generate radial motion in the robotic arm and rotary motion about an axis. It is another object of the invention to seek to provide a more compact robotic arm structure as compared to the aforesaid prior art and which is capable of achieving increased accuracy and reliability.

Accordingly, the invention provides a robotic arm assembly comprising: a driving mechanism including a rotor which is rotatable about a stator, the rotor being coaxially rotatable relative to a columnar shaft having a substantially hollow central longitudinal axis; a first arm having proximal and distal pivotal ends rigidly mounted on the rotor such that the first arm is drivable to rotate by the driving mechanism; a second arm having proximal and distal pivotal ends, the proximal pivotal end of the second arm being pivotally connected to the proximal pivotal end of the first arm; a first timing pulley mounted coaxially onto the columnar shaft; a second timing pulley spaced from the first timing pulley which is drivable to rotate together with rotation of the first arm; and a timing belt connecting the first and second timing pulleys that is operative to rotate the second arm relative to the first arm as the first arm is driven to rotate by the driving mechanism, such that the distal pivotal ends of the first and second arms are configured to always lie along a substantially straight line.

It would be convenient hereinafter to describe the invention in greater detail by reference to the accompanying drawings which illustrate preferred embodiments of the invention. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of the preferred embodiment of the invention when considered with the accompanying drawings, in which.

DETAILED DESCRIPTION OF THE PREFERRED EMBODIMENTS OF THE INVENTION

The preferred embodiments of the present invention will be described hereinafter with reference to the accompanying drawings.

Figure 1:
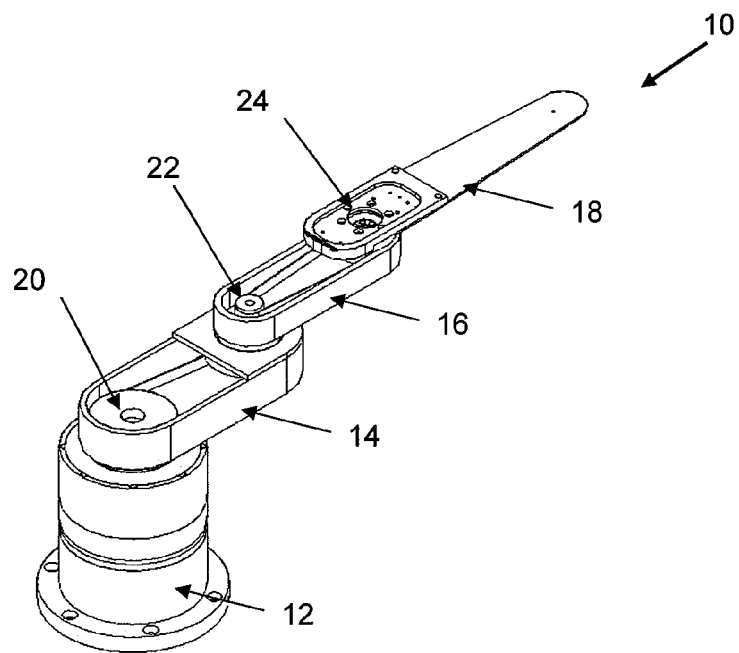
FIG. 1 is a perspective view of a robotic arm assembly having a base and a plurality of interconnected links or arms according to the first preferred embodiment of the present invention.

FIG. 1 is a perspective view of a robotic arm assembly 10 having a base 12 and a plurality of interconnected links or arms 14, 16, 18 according to the first preferred embodiment of the present invention. Top covers of the arms 14, 16, 18 have been partially removed to show respective shoulder, elbow and wrist pivots 20, 22, 24 connecting the links. The robotic arm assembly 10 has a relatively stationary base 12 which is fixedly mounted onto a stationary support surface (not shown) and about which the plurality of arms 14, 16, 18 rotate.

The plurality of arms 14, 16, 18 are rotatably coupled with respect to one another via the pivots 20, 22, 24. The first arm, which in this embodiment is a shoulder arm 14, has proximal and distal pivotal ends and is supported at its distal pivotal end at the shoulder pivot 20 and is rotatable about the shoulder pivot 20. The second arm, which in this embodiment is an elbow arm 16, also has proximal and distal pivotal ends and is rotatable about the elbow pivot 22 at its proximal pivotal end where it is connected to the proximal pivotal end of the shoulder arm 14. The third arm in the form of an end-effector 18 is rotatable about the wrist pivot 24 at the distal pivotal end of the elbow arm 16. The distance between the shoulder and elbow pivots 20, 22 at the proximal and distal ends of the shoulder arm 14 is preferably substantially equal to the distance between the elbow and the wrist pivots 22, 24 at the proximal and distal ends of the elbow arm 16. The shoulder arm 14 and the elbow arm 16 are also preferably of substantially equal length.

The end-effector 18 is located furthest away from the base 12 and is preferably mounted with a processing tool. Examples of processing tools that may be mounted to the end-effector 18 are a wafer holder or a pick-and-place tool, which may even be configured to follow a different axis of motion from the shoulder and elbow arms 14, 16, if necessary.

Figure 2:
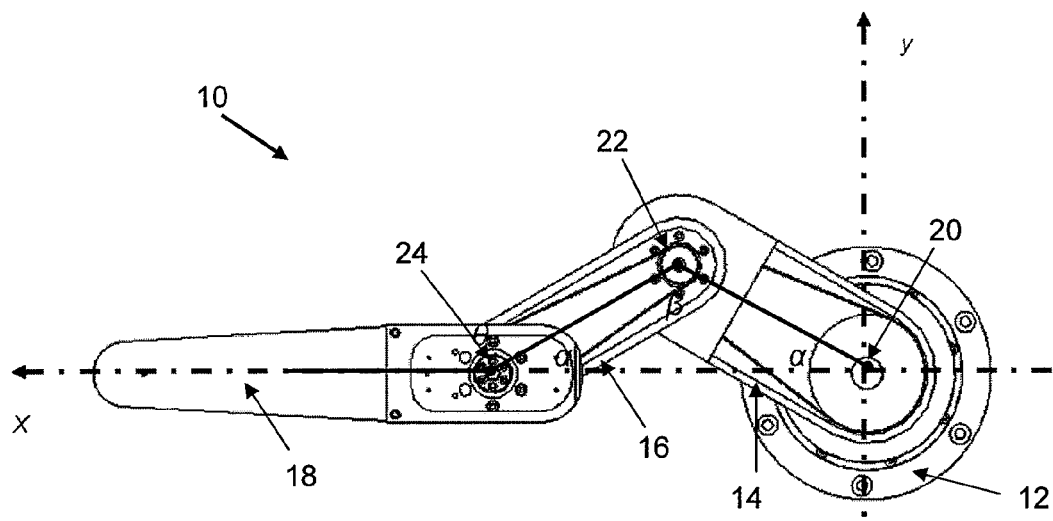
FIG. 2 is a top view of the robotic arm assembly of FIG. 1 illustrating radial motion of an end-effector along an x-axis.

FIG. 2 is a top view of the robotic arm assembly 10 of FIG. 1 illustrating radial motion of the end-effector 18 along an x-axis. Radial or R motion of the end-effector 18 refers to the end-effector travelling along a substantially straight line that passes through a center of the shoulder pivot 20 connecting the base 12 and the shoulder arm 14. In this example, the straight line is parallel to the x-axis.

To realize R motion, the relationship between the angles formed by the shoulder arm 14, elbow arm 16 and x-axis is preferably as follows:

$$\Delta\theta = \Delta\beta/2$$

$$\Delta\alpha = -\Delta\beta/2$$

where $\Delta\theta$ denotes the change in the angle between the elbow arm 16 and the end-effector 18 which is aligned with the x-axis; $\Delta\beta$ denotes the change in the angle between the shoulder arm 14 and the elbow arm 16; and $\Delta\alpha$ denotes the change in the angle between the shoulder arm 14 or the elbow arm 16 and the x-axis. Generally, the ratio of the relative rotational speed of the elbow arm 16 with respect to the shoulder arm is thus 2:1, such that the distal pivotal end of the shoulder arm 14 at the shoulder pivot 20 and the distal pivotal end of the elbow arm 16 at the wrist pivot 24 are configured to always lie along a substantially straight line (the x-axis in this example).

Figure 3:
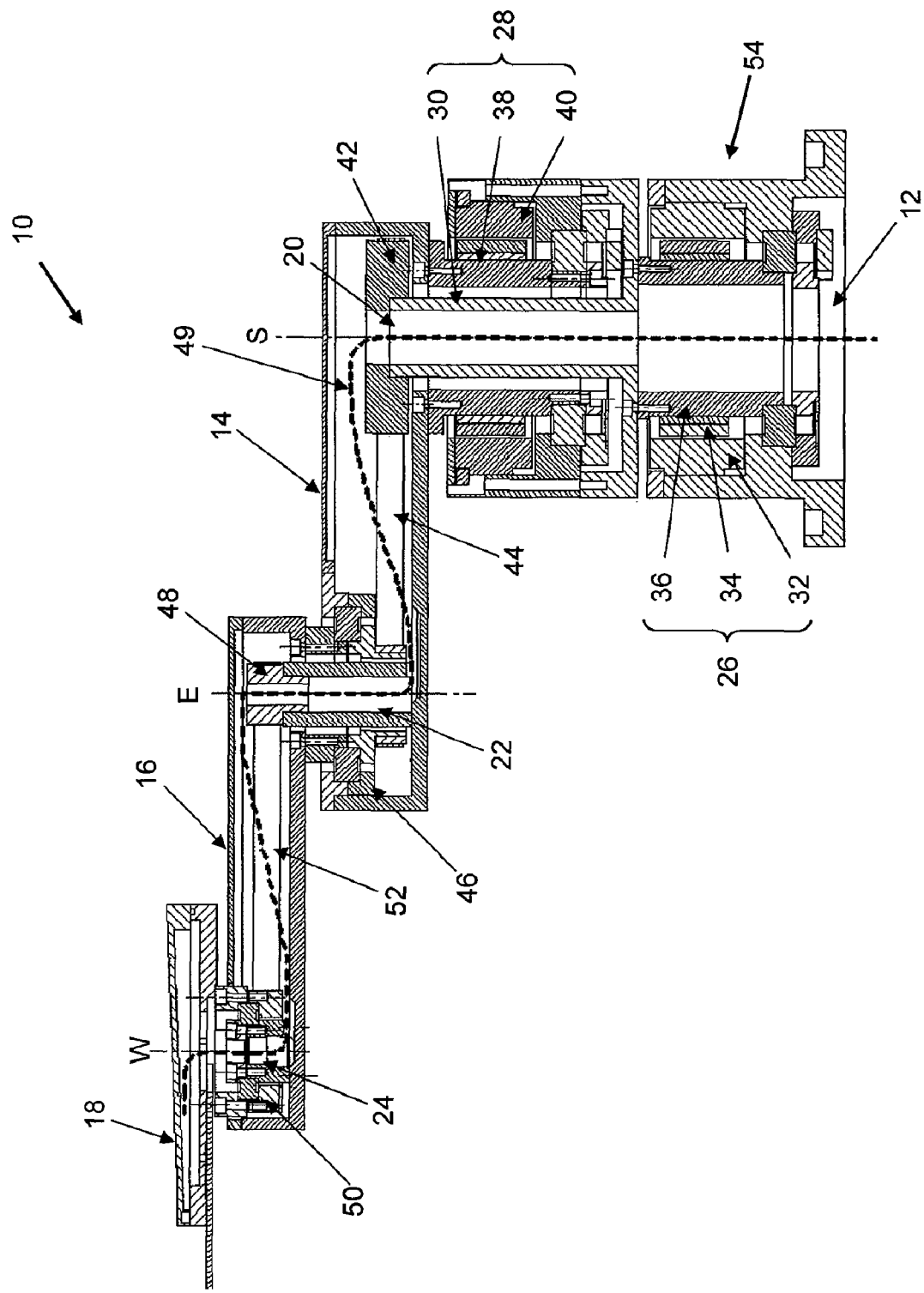
FIG. 3 is a sectional side view of the robotic arm assembly of FIG. 1 showing the components of the arms and the base of the assembly.

FIG. 3 is a sectional side view of the robotic arm assembly 10 of FIG. 1 showing the components of the arms 14, 16, 18 and the base 12 of the assembly 10. A motor assembly 54 located at the base 12 of the robotic arm assembly 10 comprises a first direct drive motor assembly or driving mechanism mounted onto a second direct drive motor assembly. The first direct drive motor assembly, such as R motor 28, includes an R motor rotor 38 that is rotatable relative to an R motor stator 40, which surrounds the R motor rotor 38. The R motor rotor 38 is also rotatable relative to a columnar shaft or coupling shaft 30, which is relatively stationary. A first timing pulley 42 is mounted at the distal pivotal end of the shoulder arm 14 on top of and coaxial with the coupling shaft 30. The R motor 28 generates R motion of the end-effector 18 that is observable as linear motion of the end-effector 18 towards or away from the base 12. The end-effector 18 is indirectly coupled to the R motor 28 via the elbow arm 16 and the shoulder arm 14.

The second direct drive motor assembly or universal motor located at the base 12 of the robotic arm assembly 10, such as T motor 26, is located co-axially with the R motor 28 and generates universal rotary motion of the robotic arm assembly 10. In the first preferred embodiment, the R motor 28 and coupling shaft 30 are mounted onto the T motor 26. The T motor 26 comprises a T motor rotor 34 which is rotatable relative to a T motor stator 32. The T motor rotor 34 is mounted onto a universal columnar shaft or T motor shaft 36, which has a substantially hollow central longitudinal axis. The T motor rotor 34 is mounted directly onto the side walls of the T motor shaft 36 and is surrounded by the T motor stator 32. The T motor 26 rotates the T motor shaft 36 about an S axis of the shoulder arm 14 to generate universal rotational motion of the R motor 28, coupling shaft 30, shoulder arm 14, elbow arm 16 and the end-effector 18 concurrently.

The coupling shaft 30 is substantially hollow along its central longitudinal axis, which makes it lightweight and allows electrical and service lines 49 such as electrical cables and wirings to be routed to the robotic arm assembly 10 within the hollow center of the coupling shaft 30. This approach is superior to connecting the electrical cables and wirings outside the robotic arm assembly 10 as in the prior art which may obstruct the free rotary motion of the robotic arm assembly 10 and which may also introduce foreign matter or even interfere with the production environment. Moreover, there is a further benefit that the length of the coupling shaft 30 can be made almost the same as the length of the R motor 28. Not only would this lead to a more compact design, it also makes the shaft 30 more rigid and significantly avoid compliance issues when the robotic arms are being driven. Greater accuracy and precision may thus be achieved. The hollow central longitudinal axis of the coupling shaft 30 also reduces the weight of the assembly.

The R motor 28 rotates the R motor rotor 38, and the shoulder arm 14 mounted on the R motor rotor 38 at the shoulder pivot 20 about the S axis to generate R motion such that the shoulder arm 14, elbow arm 16 and the end-effector 18 are all made to rotate relative to one another by the transmission system. Vertical or Z motion of the robotic arm is possible by elevating or lowering the shoulder arm 14, the elbow arm 16 and the end-effector 18 along the S axis using a Z motor (not shown).

The shoulder arm 14 is directly driven by the R motor 28. The elbow arm 16 is driven by the R motor 28 to rotate relative to the shoulder arm 14 through a first timing belt 44 such that the angle between the shoulder arm 14 and the elbow arm 16 is always maintained at twice that of the angle between the shoulder arm 14 or the elbow arm 16 and the substantially straight line (x-axis). The end-effector 18 is driven by the R motor 28 through the first timing belt 44 as well as a second timing belt 52 such that the angle between the elbow arm 16 and the end-effector 18 aligned along the x-axis is maintained to be the same as the angle between the shoulder arm 14 and the x-axis.

The actuation of the R motion is now described in greater detail. The R motor rotor 38 rotates and turns the adjoining shoulder arm 14 which rotates the first timing belt 44 that is wound around the first timing pulley 42 and a second timing pulley 46 spaced from the first timing pulley 42, which are all housed in the shoulder arm 14. The first timing belt 44 is operative to rotate the elbow arm 16 at the elbow pivot 22 about an E axis relative to the shoulder arm 14. This in turn rotates a second timing belt 52 that is wound around third and fourth timing pulleys 48, 50. The third and fourth timing pulleys 48, 50 are located at respective proximal and distal ends of the elbow arm 16, wherein the third pulley 48 is coaxial with the second timing pulley 46.

The elbow arm 16 rotates relative to the end-effector 18 about a W axis at a wrist of the robotic arm assembly 10 as the fourth timing pulley 50 turns the end-effector 18 relative to the elbow arm 16 at the wrist pivot 24. The result of this transmission process is that the rotational action of the R motor 28 is ultimately transmitted to the end-effector 18 and the robotic arm extends or retracts along a substantially straight line, which is parallel to the x-axis in this example. A simple transmission is thus realized by a train of belt and pulley systems using a single R motor 28 located at the base 12 of the robotic arm structure.

In this manner, R motion of the robotic arm assembly 10 is easily achievable using only a single R motor and a simple arrangement of transmission belts and pulleys. It should be appreciated that the axes of motion of the three arms 14, 16, 18 lie on planes that are preferably substantially parallel to one another.

Figure 4:
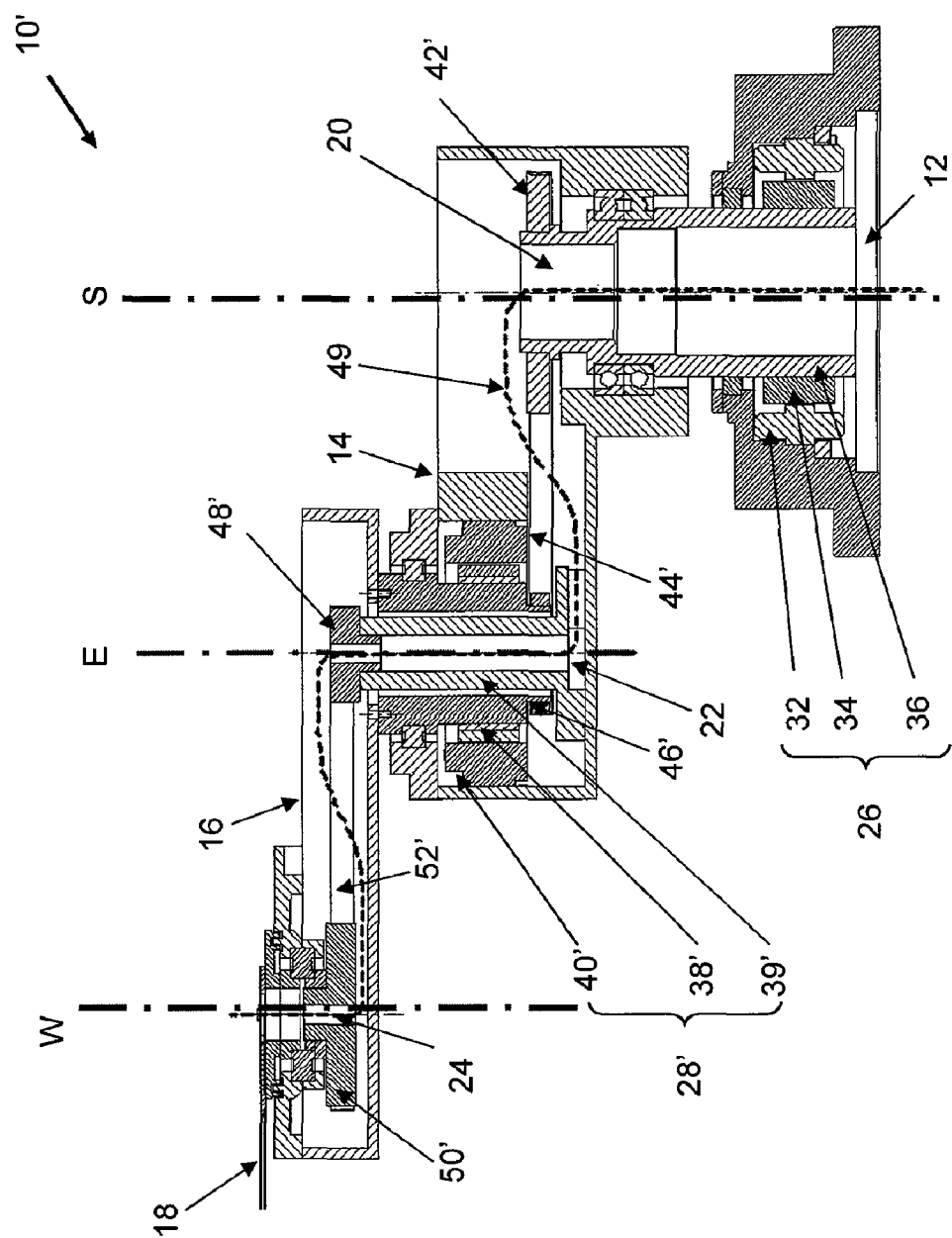
FIG. 4 is a sectional side view of a robotic arm assembly according to the second preferred embodiment of the present invention showing the components of the arms and the base of the assembly.

FIG. 4 is a sectional side view of a robotic arm assembly 10' according to the second preferred embodiment of the present invention showing the components of the arms 14, 16, 18 and the base 12 of the assembly 10'. The universal motor, or T motor 26, is located at the base 12 on which the shoulder arm 14 is mounted and the driving mechanism, such as an R motor 28', is located coaxially with the E axis at the elbow pivot 22. In this embodiment, the first arm is the elbow arm 16 and the second arm is the shoulder arm 14, and they are connected at the elbow pivot 22 located at the proximal pivotal ends of the shoulder arm 14 and the elbow arm 16. The base 12 is located at the distal pivotal end of the second arm or shoulder arm 14. The R motor 28' comprises an R motor rotor 38' and an R motor stator 40'. The R motor rotor 38' is rotatable relative to a columnar shaft or coupling shaft 39', which is relatively stationary. The coupling shaft 39' is fixedly coupled to the shoulder arm 14.

The rotation of the R motor 28' drives the elbow arm 16 which is mounted on the R motor rotor 38' directly as the R motor rotor 38' rotates about the E axis. The rotational motion of the R motor 28' also drives a first timing pulley 46' on R motor rotor 38' which rotates a first timing belt 44' that is wound around the first timing pulley 46' and a second timing pulley 42'. In this embodiment, the first timing pulley 46' is located along the E axis and is coaxial with the R motor 28'. The first timing pulley 46' and second timing pulley 42', and the first timing belt 44', are all housed in the second arm or shoulder arm 14. The first timing belt 44' rotates the second timing pulley 42' at the shoulder pivot 20 about the S axis of the shoulder arm 14 which then rotates the shoulder arm 14 relative to the base 12.

As the R motor 28' drives the first arm or elbow arm 16, a third pulley 50' on the end-effector 18 rotates a second timing belt 52', which is also wound around a fourth timing pulley 48'. The fourth timing pulley 48' is mounted onto and is coaxial with the coupling shaft 39'. The third timing pulley 50' and fourth timing pulley 48' are located at respective distal and proximal pivotal ends of the elbow arm 16. The end-effector 18 turns relative to the elbow arm 16 about the W axis as the third timing pulley 50' turns the end-effector 18 at the wrist pivot 24. In this way, the transmission process permits the rotational action of the R motor 28' located at the elbow pivot 22 to be ultimately transmitted to the end-effector 18 and the shoulder arm 14 such that the end-effector 18 of the robotic arm 10' extends or retracts along a straight line.

The second direct drive motor assembly or T motor 26 located at the base 12 of the robotic arm assembly 10' generates universal rotary motion of the robotic arm assembly 10'. In the second preferred embodiment, the T motor 26 comprises a T motor rotor 34 which is rotatable relative to a T motor stator 32. The T motor rotor 34 is mounted onto a universal columnar shaft or T motor shaft 36, which has a substantially hollow central longitudinal axis. The T motor rotor 34 is mounted directly onto the side walls of the T motor shaft 36 and is surrounded by the T motor stator 32. The T motor 26 rotates the T motor shaft 36 about the S axis of the shoulder arm 14 which is mounted on the T motor 26 to generate universal rotational motion of the shoulder arm 14, R motor 28', elbow arm 16 and the end-effector 18 concurrently. Electrical and service lines 49 may be housed within the central longitudinal axis of the T motor shaft 36.

While the elbow arm 16 is directly driven by the R motor 28', the end-effector 18 is driven by the R motor 28' through the second timing belt 52' such that the angle between the elbow arm 16 and the end-effector 18 aligned along the x-axis is half that of the angle between the shoulder arm 14 and the elbow arm 16. The shoulder arm 14 is driven by the R motor 28' through the first timing belt 44' such that the angle between the shoulder arm 14 and the x-axis is also half of the angle between the shoulder arm 14 and the elbow arm 16. The result of this transmission process is that the rotational action of the R motor 28' at the E axis is ultimately transmitted to the end-effector 18 and shoulder arm 14 using a simple transmission system realized by a train of belts and pulleys system provided by a single R motor 28' located at the E axis of the robotic arm structure.

Another advantage of this embodiment is that the R motor 28' is located closer to the end-effector 18 than in the first preferred embodiment, which results in increased accuracy and controllability of the end-effector 18.

Figure 5:
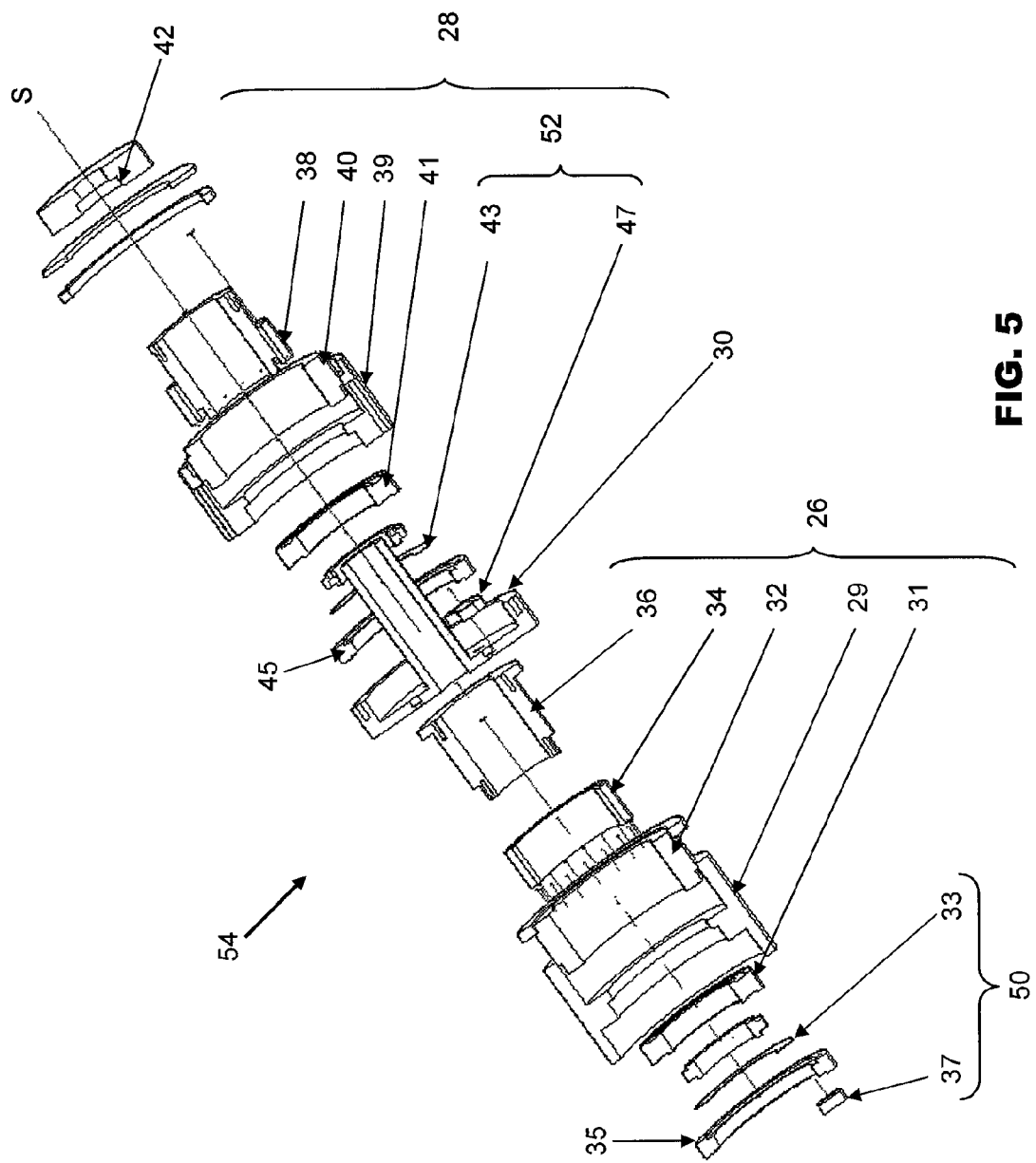
FIG. 5 is an exploded side view of the motor assembly of the robotic arm assembly according to the first preferred embodiment of the invention showing the main components of a T motor and an R motor.

FIG. 5 is an exploded side view of the motor assembly 54 of the robotic arm assembly 10 according to the first preferred embodiment of the invention showing the main components of the T motor 26 and the R motor 28. The R motor 28 is coupled to the T motor 26 by the coupling shaft 30 such that rotation of the T motor 26 turns the R motor 28 to bring about universal T motion of the coupling shaft 30, shoulder arm 16 and the other arms of the robotic arm assembly 10 about the S axis.

A T motor housing 29 houses the T motor stator 32, T motor rotor 34 and T motor shaft 36. It also houses other parts of the T motor 26, including a T motor bearing 31, a T motor bearing flange 35 and a T rotary motor encoder 50. The T rotary motor encoder 50 helps to determine a rotary position of the robotic arm assembly 10. An R motor housing 39 houses the R motor rotor 38 and the R motor stator 40. It also houses an R motor bearing 41, an R motor bearing flange 45 and an R rotary motor encoder 52.

The T and R rotary optical encoders 50, 52 of the T and R motors 26, 28 are positional measurement apparatus. The T rotary optical encoder 50 comprises a T motor encoder head 37 and a T motor encoder scale 33. The R rotary optical encoder 52 comprises an R motor encoder head 47 and a T motor encoder scale 43. The encoders may be located next to the motor shaft 36 and the coupling shaft 30. An encoder scale defines angular positions whereas an encoder head ascertains an angular disposition of the robotic arm. The encoder scales have an annular track disposed around a surface concentric with the longitudinal S-axis at the shoulder pivot 20. The encoder head may be supported by an encoder mount and disposed at a relatively short distance from the encoder scale to read the encoder scale and optically sense the angular disposition of the rotating shafts 36, 30 that are actuating the robotic arm and therefore ascertain the rotary disposition of the shoulder arm 14. Although a rotary optical encoder is herein described, it should be appreciated that other types of positional measurement apparatus, such as a magnetic encoder, may be used with the present invention.

The T motor shaft 36 is preferably in the form of a hollow cylindrical sleeve mounted with the T motor rotor 34 of the T motor drive assembly 26. The T motor rotor 34 is surrounded by the T-motor stator 32, which coaxially receives the T motor rotor 34 and T motor shaft 36. The R motor 28 is mounted on top of the T motor shaft 36 via the coupling shaft 30. As described above, the coupling shaft 30 also comprises a hollow cylindrical sleeve with one end coupled to the timing pulley 42 which turns the timing belt 44. The hollow centers of the T motor shaft 36 and coupling shaft 30 allow the respective shafts 36, 30 to contain and enclose electrical or service lines 49 for the robotic arm assembly 10 so that they are not exposed to the production environment. As the electrical wiring is contained within the hollow shafts, another advantage is that T rotation of the robotic arm throughout a 360° angle is also possible without interference by exposed electrical or service lines.

The T motor bearing 31 and the R motor bearing 41, which may both be in the form of cross-roller bearings, rotatably support the turning T motor shaft 36 and R motor rotor 38 respectively. The bearings 31, 41 may be supported and kept in position by the T motor bearing flange 35 and the R motor bearing flange 45 respectively located immediately above the bearings 31, 41. The bearing flanges 35, 45 may each include an inner flange portion for supporting a movable inner portion of the bearings 31, 41 against the motor shaft 36 and the coupling shaft 30, and an outer flange portion for supporting an outer portion of the bearings 31, 41.

It should be appreciated that the preferred embodiments of the present invention provides a transmission mechanism with a relatively simple construction which adopts a single direct drive assembly to bring about radial motion of the end-effector 18. Furthermore, the direct connection of the timing pulley 42 to the coupling shaft 30 increases the reliability of the rotating action of the timing pulley 42 since there is increased correspondence between rotation of the first timing pulley 42 and the rotation of the second timing pulley 46. Having only one single driving mechanism to drive R motion is also more cost-effective than using multiple direct drive assemblies. In the second embodiment, locating the driving mechanism between the shoulder arm 14 and the elbow arm 16 locates the radial motor 28' closer to the end-effector 18 which improves the accuracy of the driving mechanism. Overall, there is significant improvement in the compactness and controllability of the robotic arm assemblies 10, 10' according to the preferred embodiments of the invention.

The invention described herein is susceptible to variations, modifications and/or additions other than those specifically described and it is to be understood that the invention includes all such variations, modifications and/or additions which fall within the spirit and scope of the above description.

The invention claimed is:

1. A robotic arm assembly comprising:
    a hollow columnar shaft;
    a driving mechanism including a rotor and a stator, the rotor being rotatable relative to the stator, and the rotor defining an interior coaxial space in which to coaxially receive the hollow columnar shaft, so that the rotor is coaxially rotatable around the columnar shaft;
    a first arm having proximal and distal pivotal ends rigidly mounted on the rotor such that the first arm is drivable to rotate by the driving mechanism;
    a second arm having proximal and distal pivotal ends, the proximal pivotal end of the second arm being pivotally connected to the proximal pivotal end of the first arm;
    a first timing pulley mounted coaxially onto the columnar shaft;
    a second timing pulley spaced from the first timing pulley which is drivable to rotate together with rotation of the first arm; and
    a timing belt connecting the first and second timing pulleys that is operative to rotate the second arm relative to the first arm as the first arm is driven to rotate by the driving mechanism, such that the distal pivotal ends of the first and second arms are configured to always lie along a substantially straight line.

2. The robotic arm assembly as claimed in claim 1, further comprising a relatively stationary base, about which the first and second arms rotate.

3. The robotic arm assembly as claimed in claim 2, wherein the driving mechanism is located at the base.

4. The robotic arm assembly as claimed in claim 3, wherein the first and second timing pulleys are housed in the first arm, and the second timing pulley is located at the proximal pivotal end of the first arm.

5. The robotic arm assembly as claimed in claim 4, further comprising an end-effector located at the distal pivotal end of the second arm.

6. The robotic arm assembly as claimed in claim 4, further comprising third and fourth timing pulleys located at respective proximal and distal pivotal ends of the second arm and a timing belt connecting them, wherein the third timing pulley is coaxial with the second timing pulley.

7. The robotic arm assembly as claimed in claim 3, further comprising a universal motor at the base on which the driving mechanism is mounted.

8. The robotic arm assembly as claimed in claim 7, wherein the universal motor comprises a universal rotor which is rotatable relative to a universal stator, the universal rotor being mounted onto a hollow universal columnar shaft.

9. The robotic arm assembly as claimed in claim 8, wherein the universal rotor is mounted directly onto side walls of the universal columnar shaft and is surrounded by the universal stator.

10. The robotic arm assembly as claimed in claim 2, wherein the driving mechanism is located at the proximal pivotal end of the second arm and the base is located at the distal pivotal end of the second arm, and wherein the columnar shaft is rigidly coupled to the second arm.

11. The robotic arm assembly as claimed in claim 10, wherein the first and second timing pulleys are housed in the first arm, and the second timing pulley is located at a distal pivotal end of the first arm.

12. The robotic arm assembly as claimed in claim 11, further comprising third and fourth timing pulleys located at respective proximal and distal pivotal ends of the second arm and a timing belt connecting them, wherein the third timing pulley is coaxial with the columnar shaft and first timing pulley.

13. The robotic arm assembly as claimed in claim 10, further comprising a universal motor at the base on which the second arm is mounted.

14. The robotic arm assembly as claimed in claim 13, wherein the universal motor comprises a universal rotor mounted directly onto side walls of a hollow universal columnar shaft and is surrounded by a universal stator.

15. The robotic arm assembly as claimed in claim 14, further comprising electrical and service lines housed within the hollow universal columnar shaft.

16. The robotic arm assembly as claimed in claim 1, wherein the rotor surrounds the columnar shaft and the rotor is surrounded by the stator.

17. The robotic arm assembly as claimed in claim 1, further comprising electrical and service lines housed within the hollow columnar shaft.

18. The robotic arm assembly as claimed in claim 1, wherein a distance between the proximal and distal pivotal ends of the first arm is substantially equal to a distance between the proximal and distal pivotal ends of the second arm.

19. The robotic arm assembly as claimed in claim 18, wherein the first and second arms are of substantially equal length.

20. The robotic arm assembly as claimed in claim 1, wherein an angle between the first arm and the second arm is always maintained at twice the angle between the first arm and the substantially straight line.

* * * * *